US 6,641,403 B1

(12) United States Patent
Bavasso

(10) Patent No.: US 6,641,403 B1
(45) Date of Patent: Nov. 4, 2003

(54) CHILD SHOE-LACING AND DRESSING LEARNING KIT

(76) Inventor: Janet R. Bavasso, 250 Beach 130th St., Belle Harbor, NY (US) 11694

( * ) Notice: Subject to any disclaimer, the term of this patent is extended or adjusted under 35 U.S.C. 154(b) by 189 days.

(21) Appl. No.: 09/899,966

(22) Filed: Jul. 6, 2001

(51) Int. Cl.$^7$ .................. G09B 19/24; G09B 19/00; A63B 69/00
(52) U.S. Cl. .................. 434/260; 434/247; 434/248; 434/433
(58) Field of Search .................. 434/260, 433, 434/247, 258, 395, 397; 289/1.5, 1.2, 17, 18.1

(56) References Cited

U.S. PATENT DOCUMENTS

| | | | |
|---|---|---|---|
| D143,237 S | 12/1945 | Pares | |
| 4,017,984 A | * 4/1977 | Bonfigli | 434/260 |
| 4,978,304 A | * 12/1990 | Alexander | 434/260 |
| 5,209,667 A | 5/1993 | Stanfield | |
| 5,240,418 A | * 8/1993 | Silverman et al. | 434/260 |
| 5,372,510 A | 12/1994 | Stanfield | |
| 5,562,457 A | * 10/1996 | Haslam | 434/260 |
| 5,611,692 A | * 3/1997 | Gehrdes | 434/260 |
| 5,897,323 A | 4/1999 | Stanfield | |
| 6,116,909 A | * 9/2000 | Chapman | 434/260 |
| 6,151,715 A | * 11/2000 | Doherty | 2/48 |

* cited by examiner

Primary Examiner—Davis Hwu

(57) ABSTRACT

A child shoe-lacing and dressing learning kit for teaching a child between the ages of 3 and 6 to tie shoes and dress oneself. The child shoe-lacing and dressing learning kit includes a pair of strap members each having an outer side and first and second longitudinal edges and being adapted to fasten about thighs of seated users; and also includes a pair of shoe members being removably fastened upon the outer sides of the strap members and having shoe lace holes therein; and further includes shoe laces for lacing up the shoe members; and also includes fastening members being attached to the strap members and to the shoe members.

3 Claims, 3 Drawing Sheets

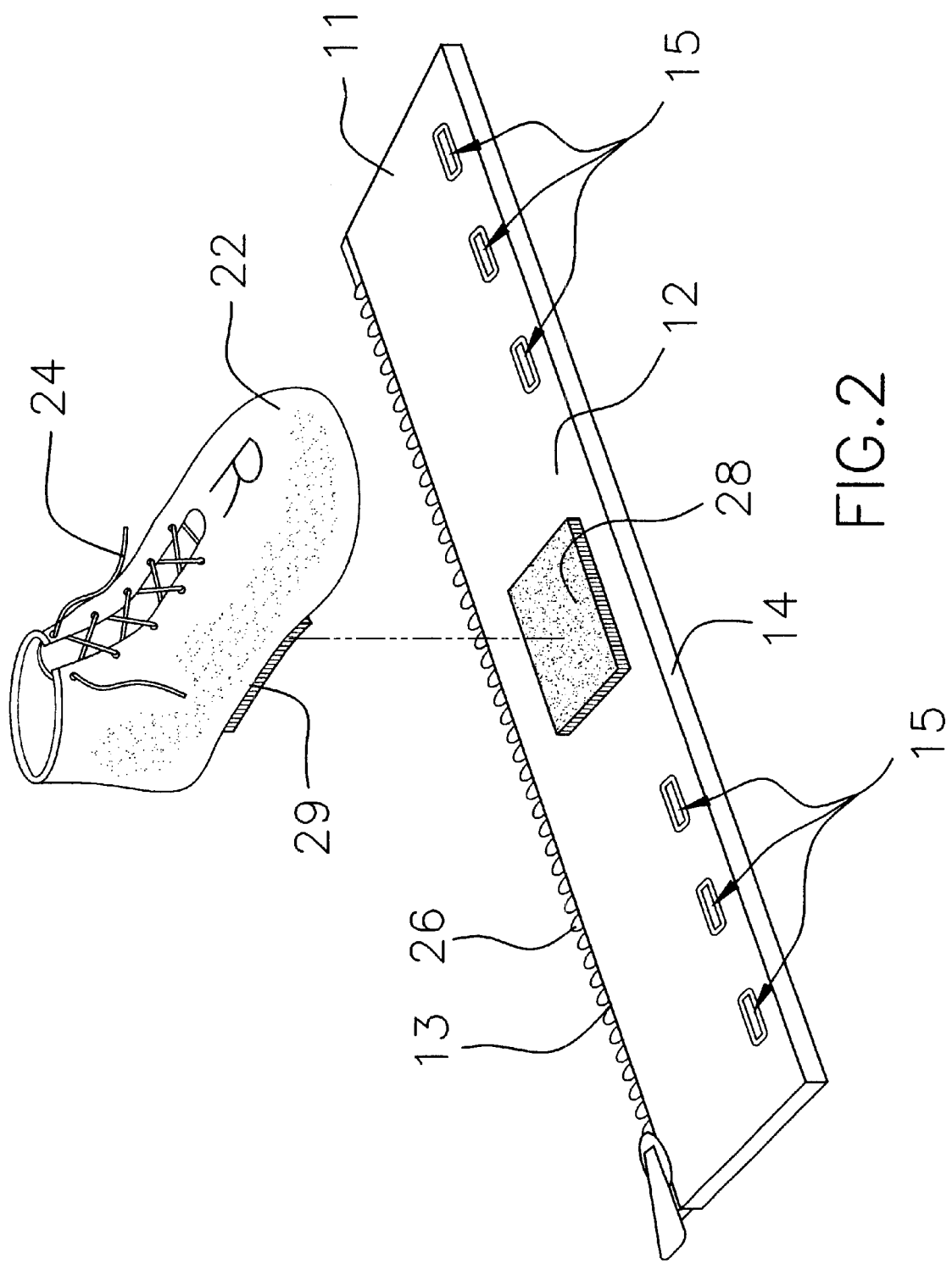

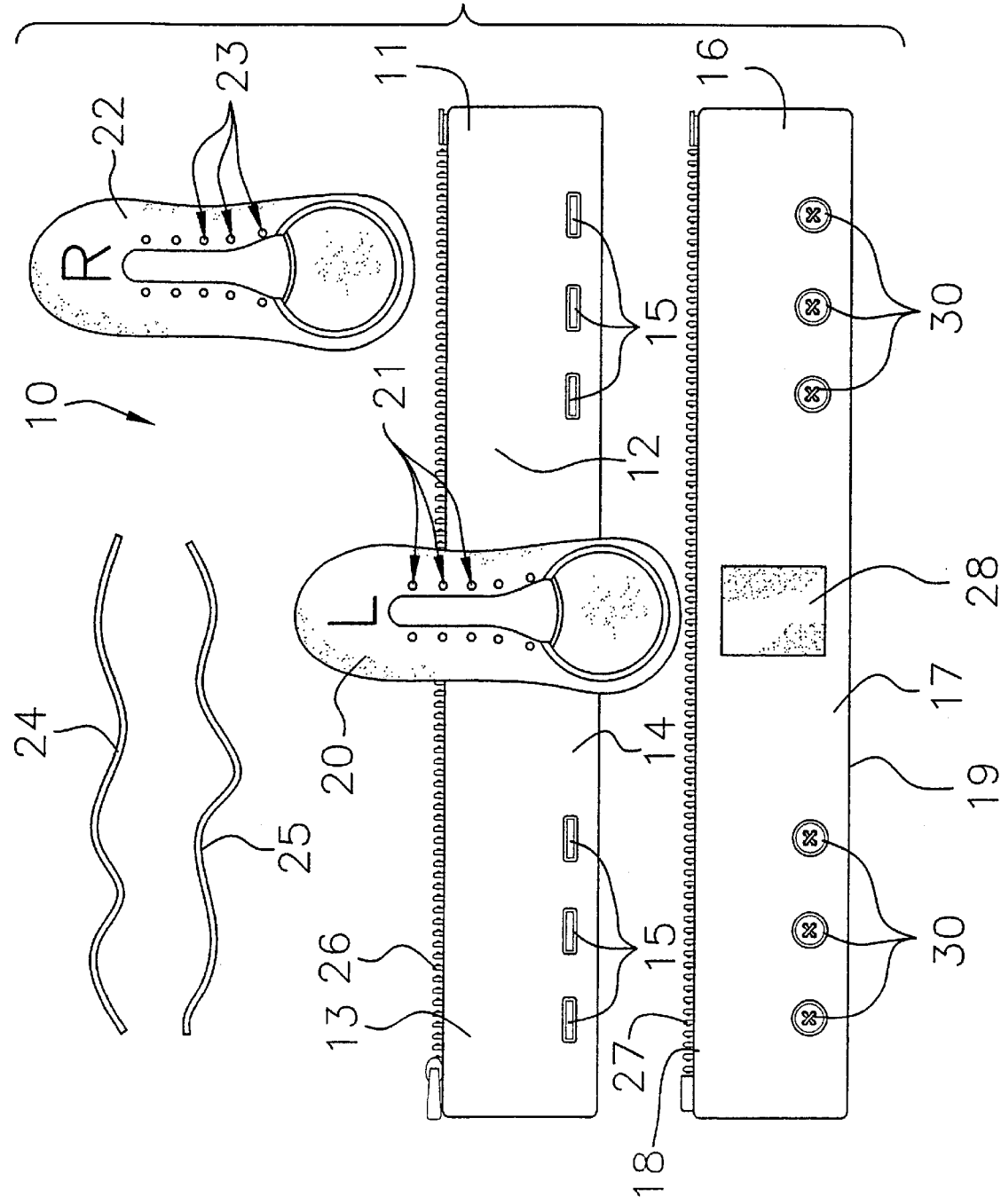

CHILD SHOE-LACING AND DRESSING LEARNING KIT

BACKGROUND OF THE INVENTION

1. Field of the Invention

The present invention relates to child educational tools and more particularly pertains to a new child shoe-lacing and dressing learning kit for teaching a child between the ages of 3 and 6 to tie shoes and dress oneself.

2. Description of the Prior Art

The use of child educational tools is known in the prior art. More specifically, child educational tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,017,984; U.S. Pat. No. 4,978,304; U.S. Pat. No. 5,897,323; U.S. Pat. No. 5,372,510; U.S. Pat. No. 5,209,667; and U.S. Pat. No. Des. 143,237.

While these devices fulfill their respective, particular objectives and requirements, the aforementioned patents do not disclose a new child shoe-lacing and dressing learning kit. The inventive device includes a pair of strap members each having an outer side and first and second longitudinal edges and being adapted to fasten about thighs of seated users; and also includes a pair of shoe members being removably fastened upon the outer sides of the strap members and having shoe lace holes therein; and further includes shoe laces for lacing up the shoe members; and also includes fastening members being attached to the strap members and to the shoe members.

In these respects, the child shoe-lacing and dressing learning kit according to the present invention substantially departs from the conventional concepts and designs of the prior art, and in so doing provides an apparatus primarily developed for the purpose of teaching a child between the ages of 3 and 6 to tie shoes and dress oneself.

SUMMARY OF THE INVENTION

In view of the foregoing disadvantages inherent in the known types of child educational tools now present in the prior art, the present invention provides a new child shoe-lacing and dressing learning kit construction-wherein the same can be utilized for teaching a child between the ages of 3 and 6 to tie shoes and dress oneself.

The general purpose of the present invention, which will be described subsequently in greater detail, is to provide a new child hoe-lacing and dressing learning kit which has many of the advantages of the child educational tools mentioned heretofore and many novel features that result in a new child shoe-lacing and dressing learning kit which is not anticipated, rendered obvious, suggested, or even implied by any of the prior art child educational tools, either alone or in any combination thereof.

To attain this, the present invention generally comprises a pair of strap members each having an outer side and first and second longitudinal edges and being adapted to fasten about thighs of seated users; and also includes a pair of shoe members being removably fastened upon the outer sides of the strap members and having shoe lace holes therein; and further includes shoe laces for lacing up the shoe members; and also includes fastening members being attached to the strap members and to the shoe members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child shoe-lacing and dressing learning kit which has many of the advantages of the child educational tools mentioned heretofore and many novel features that result in a new child shoe-lacing and dressing learning kit which is not anticipated, rendered obvious, suggested, or even implied by any of the prior art child educational tools, either alone or in any combination thereof.

It is another object of the present invention to provide a new child shoe-lacing and dressing learning kit which may be easily and efficiently manufactured and marketed.

It is a further object of the present invention to provide a new child shoe-lacing and dressing learning kit which is of a durable and reliable construction.

An even further object of the present invention is to provide a new child shoe-lacing and dressing learning kit which is susceptible of a low cost of manufacture with regard to both materials and labor, and which accordingly is then susceptible of low prices of sale to the consuming public, thereby making such child shoe-lacing and dressing learning kit economically available to the buying public.

Still yet another object of the present invention is to provide a new child shoe-lacing and dressing learning kit which provides in the apparatuses and methods of the prior art some of the advantages thereof, while simultaneously overcoming some of the disadvantages normally associated therewith.

Still another object of the present invention is to provide a new child shoe-lacing and dressing learning kit for teaching a child between the ages of 3 and 6 to tie shoes and dress oneself.

Yet another object of the present invention is to provide a new child shoe-lacing and dressing learning kit which includes a pair of strap members each having an outer side and first and second longitudinal edges and being adapted to fasten about thighs of seated users; and also includes a pair of shoe members being removably fastened upon the outer sides of the strap members and having shoe lace holes therein; and further includes shoe laces for lacing up the shoe members; and also includes fastening members being attached to the strap members and to the shoe members.

Still yet another object of the present invention is to provide a new child shoe-lacing and dressing learning kit that is a fun-filled learning tool for small children to learn to dress oneself.

Even still another object of the present invention is to provide a new child shoe-lacing and dressing learning kit that is easy and convenient to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is perspective view of the other of the strap members and shoe members of the present invention.

FIG. 3 is a top plan view of the present invention.

DESCRIPTION OF THE PREFERRED EMBODIMENT

Figure 1:
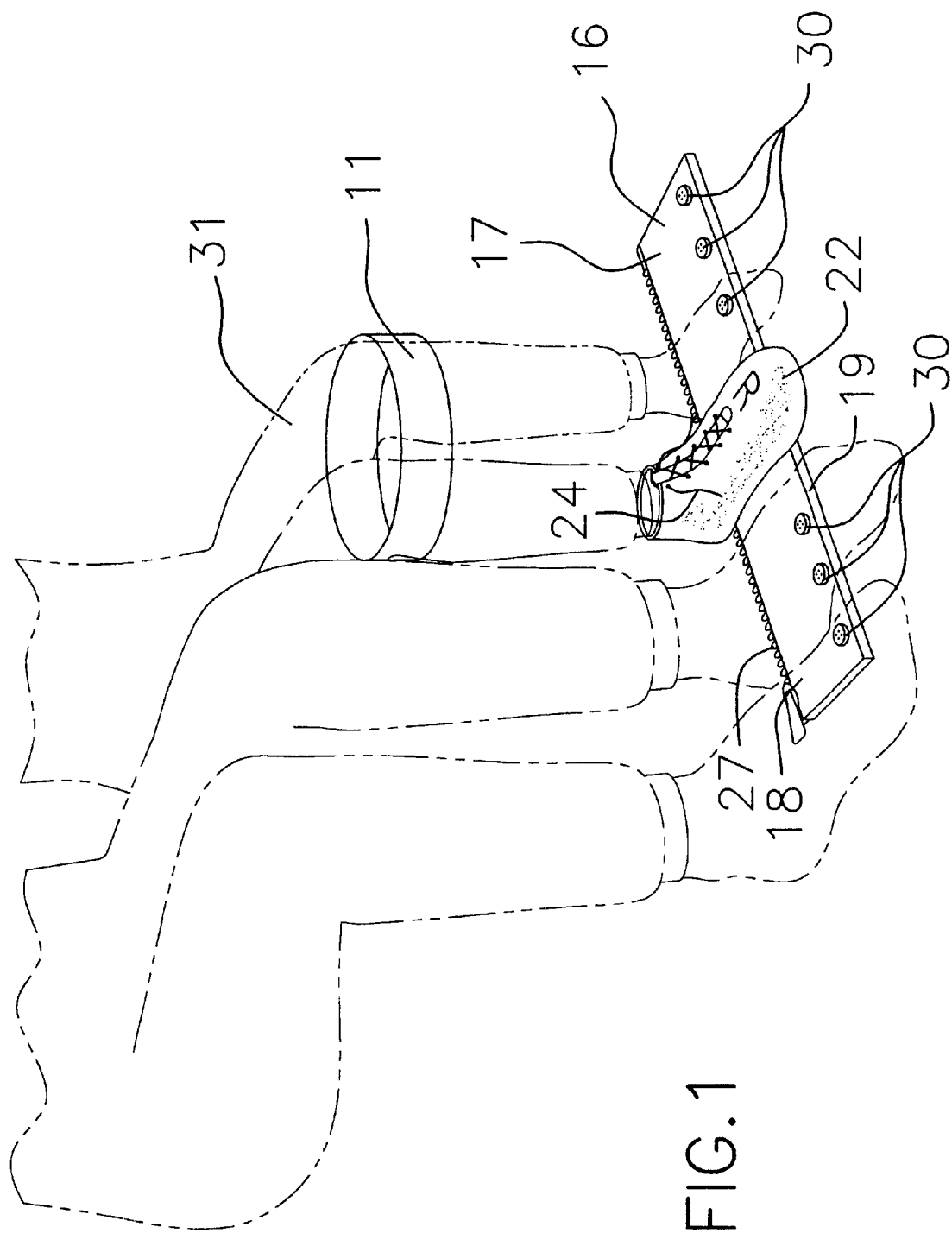
FIG. 1 is a perspective view of a one of the strap members and shoe members of a new child shoe-lacing and dressing learning kit according to the present invention.

With reference now to the drawings, and in particular to FIGS. 1 through 3 thereof, a new child shoe-lacing and dressing learning kit embodying the principles and concepts of the present invention and generally designated by the reference numeral 10 will be described.

As best illustrated in FIGS. 1 through 3, the child shoe-lacing and dressing learning kit 10 generally comprises a pair of strap members 11,16 each having an outer side 12,17 and first and second longitudinal edges 13,14,18,19 and being adapted to conventionally fasten about thighs 31 of seated users. The strap members 11,16 include a first strap member 11 and a second strap member 16. The first strap member 11 includes a plurality of button holes 15 being spacedly disposed therethrough and along the first longitudinal edge 14 thereof.

A pair of shoe members 20,22 are removably fastened upon the outer sides 12,17 of the strap members 11,16 and have shoe lace holes 21,23 therein. One of the shoe members 20 has a letter "L" displayed upon a toe portion thereof, and the other of the shoe members 22 has a letter "R" displayed upon a toe portion thereof. The child shoe-lacing and dressing learning kit also includes shoe laces 24,25 for lacing up the shoe members 20,22.

Fastening members 26–30 are conventionally attached to the strap members 11,16 and to the shoe members 20,22. The fastening members 26–30 include zippers 26,27 being conventionally attached along the second longitudinal edges 13,18 of the first and second strap members 11,16, and also include strips of hook and loop fasteners 28,29 being conventionally attached upon the outer sides 12,17 of the first and second strap members 11,16 and upon bottoms of the shoe members 20,22 for fastening the shoe members 20,22 to the first and second strap members 11,16, and further include button members 30 being spaced and conventionally disposed upon the outer side 17 and along the first longitudinal edge 19 of the second strap member 16 and being removably received in the button holes 15.

In use, the users are seated and fastens the strap members 11,16 about their thighs 31 with the shoe members 20,22 being disposed upon a top of the thighs 31, and laces and ties the shoe members 20,22 using the shoe laces 24,25. After finishing, the users would remove the shoe members 20,22 from the strap members 11,16 and would remove the strap members 11,16 from about their thighs 31, and would zip the zippers 26,27 together and would also insert the button members 30 in the proper button holes 15 to practicing dressing oneself.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child shoe-lacing and dressing learning kit comprising:
   a pair of strap members each having an outer side and first and second longitudinal edges and being adapted to fasten about thighs of seated users;
   a pair of shoe members being removably fastened upon said outer sides of said strap members and having shoe lace holes therein;
   shoe laces for lacing up said shoe members; and
   fastening members being attached to said strap members and to said shoe members;
   wherein said strap members include a first strap member and a second strap member
   wherein said first strap member includes a plurality of button holes being spacedly disposed therethrough and along said first longitudinal edge thereof; and
   wherein said fastening members include zippers being attached along said second longitudinal edges of said first and second strap members, and also include strips of hook and loop fasteners being attached upon said outer sides of said first and second strap members and upon bottoms of said shoe members for fastening said shoe members to said first and second strap members, and further include button members being spaced disposed upon said outer side and along said first longitudinal edge of said second strap member and being removably received in said button holes.

2. A child shoe-lacing and dressing learning kit as described in claim 1, wherein one of said shoe members has a letter "L" displayed upon a toe portion thereof, and the other of said shoe members has a letter "R" displayed upon a toe portion thereof.

3. A child shoe-lacing and dressing learning kit comprising:

a pair of strap members each having an outer side and first and second longitudinal edges and being adapted to fasten about thighs of seated users, said strap members including a first strap member and a second strap member, said first strap member including a plurality of button holes being spacedly disposed therethrough and along said first longitudinal edge thereof;

a pair of shoe members being removably fastened upon said outer sides of said strap members and having shoe lace holes therein, one of said shoe members having a letter "L" displayed upon a toe portion thereof, and the other of said shoe members having a letter "R" displayed upon a toe portion thereof;

shoe laces for lacing up said shoe members; and fastening members being attached to said strap members and to said shoe members, said fastening members including zippers being attached along said second longitudinal edges of said first and second strap members, and also including strips of hook and loop fasteners being attached upon said outer sides of said first and second strap members and upon bottoms of said shoe members for fastening said shoe members to said first and second strap members, and further including button members being spaced disposed upon said outer side and along said first longitudinal edge of said second strap member and being removably received in said button holes.

* * * * *